(12) United States Patent
Baker et al.

(10) Patent No.: US 7,634,415 B2
(45) Date of Patent: Dec. 15, 2009

(54) SYSTEMS AND PROCESSES FOR TECHNOLOGY ASSET MANAGEMENT

(75) Inventors: LaVeria Baker, Atlanta, GA (US);
Vernon Meadows, Lilburn, GA (US);
Wendy Eason, Decatur, GA (US);
William Hartselle, Norcross, GA (US);
Todd Mitchem, Decatur, GA (US);
Marcus Delgado, Atlanta, GA (US);
Scott Frank, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1441 days.

(21) Appl. No.: 10/330,354

(22) Filed: Dec. 30, 2002

(65) Prior Publication Data
US 2003/0195764 A1 Oct. 16, 2003

Related U.S. Application Data

(63) Continuation-in-part of application No. 10/188,209, filed on Jul. 3, 2002, now Pat. No. 7,386,460, which is a continuation of application No. 10/004,497, filed on Dec. 6, 2001, now abandoned, which is a continuation of application No. 09/750,012, filed on Dec. 29, 2000, now abandoned, application No. 10/330,354, which is a continuation-in-part of application No. 09/750,154, filed on Dec. 29, 2000, now Pat. No. 7,346,518, and a continuation-in-part of application No. 09/946,457, filed on Sep. 6, 2001, now Pat. No. 7,389,239, which is a continuation of application No. 09/750,000, filed on Dec. 29, 2000, now abandoned, application No. 10/330,354, which is a continuation-in-part of application No. 09/750,130, filed on Dec. 29, 2000, now Pat. No. 7,127,405, and a continuation-in-part of application No. 09/750,001, filed on Dec. 29, 2000, application No. 10/330,354, which is a continuation-in-part of application No. 09/946,593, filed on Sep. 6, 2001, now Pat. No. 7,406,425, which is a continuation of application No. 09/750,136, filed on Dec. 29, 2000, now abandoned.

(60) Provisional application No. 60/192,862, filed on Mar. 29, 2000, provisional application No. 60/173,919, filed on Dec. 30, 1999, provisional application No. 60/372,978, filed on Apr. 16, 2002.

(51) Int. Cl.
*G06Q 99/00* (2006.01)
(52) U.S. Cl. ........................................................ 705/1
(58) Field of Classification Search ................. 705/1
See application file for complete search history.

(56) References Cited

U.S. PATENT DOCUMENTS 6,061,660 A * 5/2000 Eggleston et al. ............. 705/14
6,298,327 B1 * 10/2001 Hunter et al. .................. 705/1

* cited by examiner

*Primary Examiner*—Jonathan Ouellette
(74) *Attorney, Agent, or Firm*—Hope Baldauff Hartman, LLC

(57) ABSTRACT

Embodiments of the present invention relate to systems and methods for technology asset management. In an embodiment, the technology asset management system includes a web interface for technology asset management customers and a server back end database to store technology asset management information. The technology asset management system can also include one or more of a plurality of intercoupled technology asset management modules, wherein the technology asset management modules include one or more of an invention submission module, an innovation awards module, a portfolio management module, a patent strategy module, and an intellectual property licensing management module. The one or more technology asset management modules can be coupled to the web interface and the server back end database.

14 Claims, 8 Drawing Sheets

SYSTEMS AND PROCESSES FOR TECHNOLOGY ASSET MANAGEMENT

CROSS-REFERENCE TO RELATED APPLICATION

This application: is a continuation-in-part of U.S. Pat. No. 7,386,460, filed Jul. 3, 2002, which is a continuation of application Ser. No. 10/004,497, filed Dec. 6, 2001, now abandoned, which is a continuation of application Ser. No. 09/750,012 filed Dec. 29, 2000, now abandoned, which claimed the benefit of U.S. Provisional Application No. 60/192,862 filed Mar. 29, 2000, and U.S. Provisional Application No. 60/173,919, filed Dec. 30, 1999; and is also a continuation-in-part of U.S. Pat. No. 7,346,518, filed Dec. 29, 2000, which claimed the benefit of U.S. Provisional Application No. 60/192,862 filed Mar. 29, 2000, and U.S. Provisional Application No. 60/173,919, filed Dec. 30, 1999; and is also a continuation-in-part of U.S. Pat. No. 7,389,239, filed Sep. 6, 2001, which is a continuation of application Ser. No. 09/750,000, filed Dec. 29, 2000, now abandoned, which claimed the benefit of U.S. Provisional Application No. 60/192,862 filed Mar. 29, 2000, and U.S. Provisional Application No. 60/173,919, filed Dec. 30, 1999; and is also a continuation-in-part of U.S. Pat. No. 7,127,405, filed Dec. 29, 2000, which claimed the benefit of U.S. Provisional Application No. 60/192,862 filed Mar. 29, 2000, and U.S. Provisional Application No. 60/173,919, filed Dec. 30, 1999; and is also a continuation-in-part of application Ser. No. 09/750,001, filed Dec. 29, 2000, which claimed the benefit of U.S. Provisional Application No. 60/192,862 filed Mar. 29, 2000, and U.S. Provisional Application No. 60/173,919, filed Dec. 30, 1999; and is also a continuation-in-part of U.S. Pat. No. 7,406,425, filed Sep. 6, 2001, which is a continuation of application Ser. No. 09/750,136, filed Dec. 29, 2000, now abandoned, which claimed the benefit of U.S. Provisional Application No. 60/192,862 filed Mar. 29, 2000, and U.S. Provisional Application No. 60/173,919, filed Dec. 30, 1999.

This application also claims the benefit of U.S. Provisional Patent Application Ser. No. 60/372,978 flied Apr. 16, 2002, which is herein incorporated by reference in its entirety.

BACKGROUND OF THE INVENTION

1. Field of the Invention

Embodiments of the present invention relate to asset management. More particularly, embodiments of the present invention relate to systems and processes for technology asset management.

2. Background Information

Known systems for technology asset management, such as intellectual property management, include docketing systems. Docketing systems typically include a data record corresponding to an intellectual property asset such as a patent application, a trademark application, and so forth. The docketing data record includes information identifying the intellectual property asset and legal deadlines for taking actions related to prosecution and/or maintenance of the intellectual property asset. Docketing systems are usually directed to tracking an intellectual property asset after an application corresponding to the intellectual property asset has been filed, for example, with the United States Patent and Trademark Office.

Another example of a known technology asset management system can provide statistical information related to the patent prosecution of an invention disclosure. Examples of the statistical information include number of issued patents, number of specific patent application types, number of inventors, and so on.

These known systems do not, for example, manage information related to a substantial portion of developing, protecting, and obtaining value for the intellectual property asset. In view of the foregoing, it can be appreciated that a substantial need exists for systems and methods that can advantageously provide for technology asset management.

BRIEF SUMMARY OF THE INVENTION

Embodiments of the present invention relate to systems and methods for technology asset management. In an embodiment, the technology asset management system includes a web interface for technology asset management customers and a server back end centralized database to store technology asset management information. The technology asset management system can manage the complete cycle of patent protection and it's interrelation between a company's technology and intellectual assets and licensing initiatives. The technology asset management system can also include one or more of a plurality of intercoupled technology asset management modules, wherein the technology asset management modules include one or more of an invention submission module, an innovation awards module, a portfolio management module, a patent strategy module, and an intellectual property licensing management module. The one or more technology asset management modules can be coupled with one another and to the web interface and the server back end database.

In another embodiment, a method for managing technology assets includes receiving technology asset information from a web interface for technology asset management customers and communicating at least a first subset of the technology asset information to one or more of a plurality of intercoupled technology asset management modules. The technology asset management modules can be selected from a group including an invention submission module, an innovation awards module, a portfolio management module, a patent strategy module, and an intellectual property licensing management module. The method can also include storing at least a second subset of the technology asset information in a technology asset management server.

A system for technology asset management, in another embodiment of the present invention, includes a means for receiving technology asset management information via a computer interface and means for processing the technology asset management information received via the means for receiving technology asset management information. The system also includes a means for storing at least a portion of the technology asset management information received via the means for receiving technology asset management information.

Figure 1:
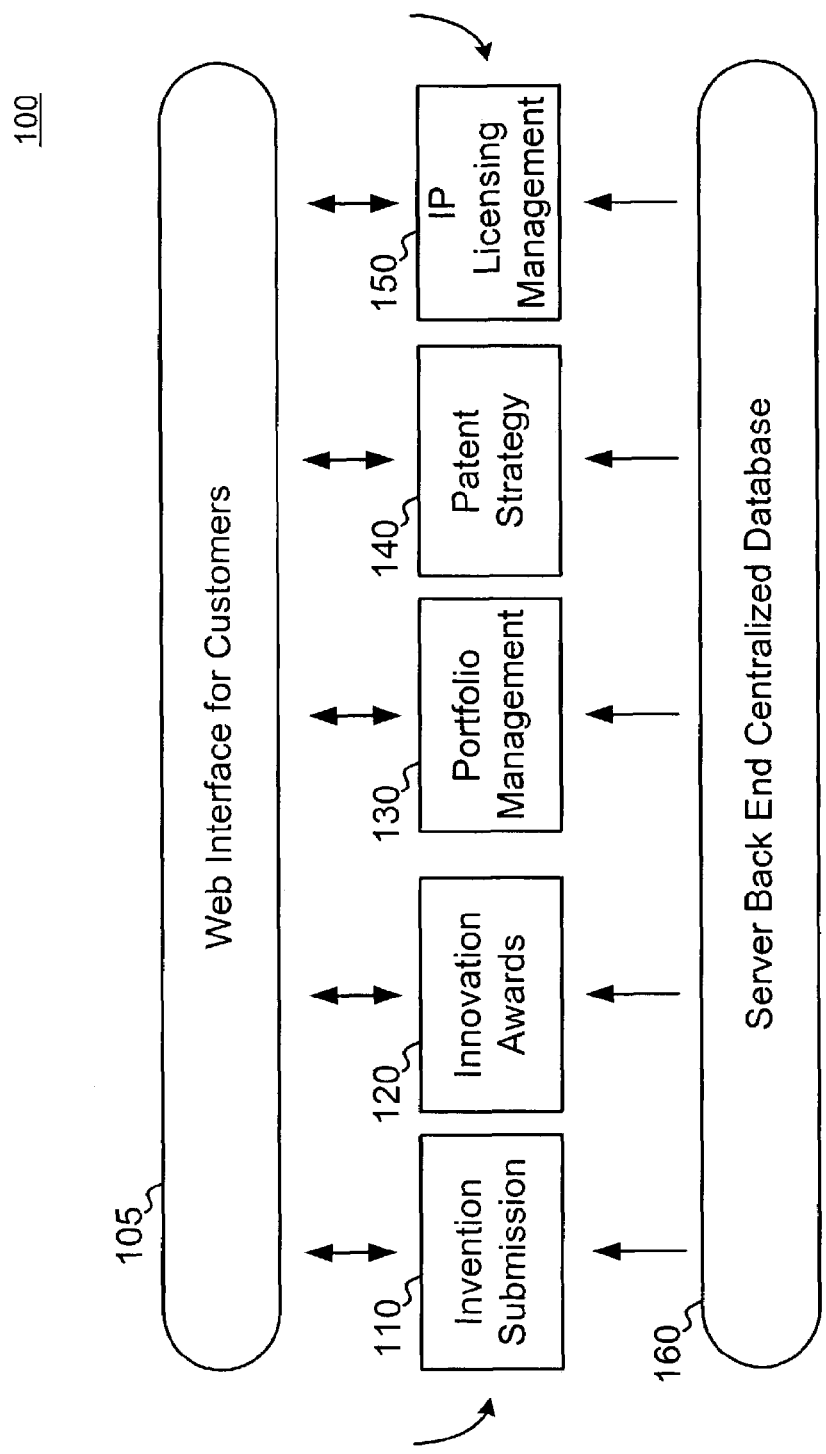
FIG. 1 is a high-level schematic of a system in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

According to an embodiment of the present invention, a system can track and manage an invention disclosure's complete life cycle while integrating those phases into licensing initiatives. The system can include one or more modules (e.g., software modules) to track and manage elements of an invention disclosure's complete life cycle. Examples of elements of an invention disclosure's complete life cycle include:

- effectively managing a receipt and initial processing stage of an invention disclosure;
- determining (e.g., quickly and accurately) the status of a disclosure or technology asset in a patent prosecution/invention disclosure cycle;
- ascertaining correlations among legally protected intellectual property (IP) assets (e.g., all legally protected IP assets of a company);
- determining the correlation between the IP assets (e.g., company IP assets) and consumer products, business products, and other products;
- a user-friendly communication tool that allows independent search, submission, and review by IP asset development customers (e.g., inventors, employees, IP coordinators, and so on);
- effectively and automatically communicating necessary information at the appropriate (e.g., pre-determined) time;
- calculating and tracking a value of company patents; and
- ensuring Information Disclosure Statement ("IDS") compliance with the United States Patent and Trademark Office ("USPTO").

Another embodiment of the present invention allows for tracking and managing a patent's complete life cycle (e.g., from idea to licensed patent) while integrating those phases into licensing initiatives. There are number of steps that must be effectively managed prior to the filing of a patent application, and embodiments of the present invention include modules corresponding to these steps.

These steps include process to:

- educate a potential inventor on intellectual property protection and the importance of such protection;
- research if the idea has already been submitted by another inventor for intellectual property protection;
- evaluate if a submitted invention disclosure is patentable;
- evaluate the commercial viability of a submitted disclosure;
- evaluate the type of protection to pursue;
- instruct an inventor how to write an effective invention disclosure;
- submit invention disclosures and track its processing, protection and prosecution status;
- retrieve and display information to support review of invention disclosures and decisions regarding whether patent protection is pursued;
- managing an incentive award program;
- determining patent mapping and expansion of submitted technology;
- develop cross-functional tools such that marketing, legal, and management teams/organizations are able to communicate (e.g., effortlessly) about technology assets (e.g., so that the respective teams are speaking the same language).
- disseminate information (e.g., automatically at the appropriate times) and extract customized information (e.g., status reports, portfolio reports, etc.).

Embodiments of the present invention can include one or more modules related to six phases of an invention disclosure's (e.g., a patent's) life cycle:

- a period prior to submission of the invention disclosure;
- invention disclosure submission;
- invention disclosure tracking prior to filing for intellectual property protection (patentability evaluation, invention disclosure status review, incentive awards status review);
- patent prosecution tracking (prosecution, law firm management, IDS compliance, patent mapping, incentive awards program, cost tracking);
- IP licensing (e.g., technology licensing prior to patent issuance, trademark licensing, cost tracking, revenue generation); and
- issued patent (e.g., infringement analysis, maintenance fees, licensing, incentive awards program, etc.)

In various ways, other known systems may address the last three phases of the life cycle. In particular, they typically focus more on the patent prosecution life cycle. Embodiments of the present invention can focus on all six phases of the life system and their interaction among one another thereby effectively managing up to the complete life cycle of an invention disclosure.

For example, customer service is a major component of the system. In many corporations intellectual property protection responsibilities can be the domain of an intellectual property protection entity (e.g., an intellectual property department, an intellectual property management corporation, or the general counsel's office), and the other constituent parts of the corporation (e.g., other departments, divisions, subsidiaries, employees, etc.) can be considered to be the customers of the intellectual property protection entity. An embodiment of the present invention (e.g., a Technology Asset Management System ("TAMS") allows the independent searches, submissions, and status checks by an inventor, potential inventor, or customer. Additionally, the system provides robust communication by including customized reporting and auto communication dissemination (e.g., the entry of data in certain fields, triggering an auto response to the intended party, and so on). Additionally, embodiments of the present invention can integrate all six life cycle phases such that value information is retained through out and built upon to ensure an accurate, complete, and thorough system that limits the need for additional personnel.

FIG. 1 is a high-level schematic of a system in accordance with an embodiment of the present invention. A web interface 105 can provide customers to access to a TAMS embodiment 100. TAMS embodiment 100 can include an invention submission module 110, an innovation awards module 120, a portfolio management module 130, a patent strategy module 140, and an IP licensing management module 150, each of which can be coupled to web interface 105 and to one another.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

Figure 2:
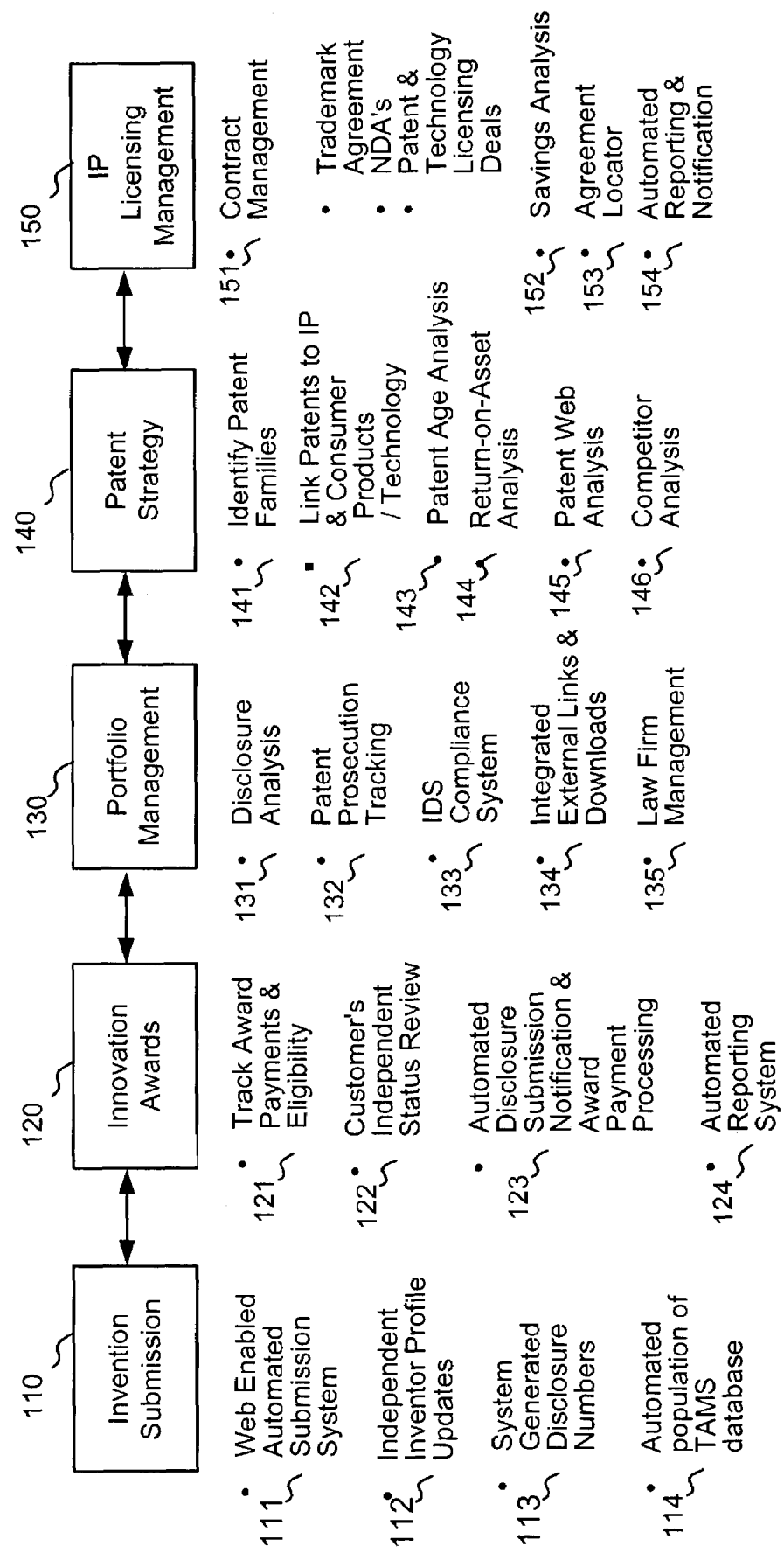
FIG. 2 is a schematic of modules illustrated in FIG. 1.

FIG. 2 is a schematic of modules illustrated in FIG. 1. In an embodiment, invention submission module 110 can include one or more of a web-enabled automated submission system 111, an independent inventor profile updates module 112, a system generated disclosure number module 113, and an automated TAMS database population module 114.

Innovations award module 120 can include track payments and eligibility module 121, customer's independent status review module 122, automated disclosure submission notification and award payment processing module 123, and automated reporting system module 124.

Portfolio management module 130 can include disclosure analysis module 131, patent prosecution tracking module 132, IDS compliance system module 133, integrated external links and downloads module 134, and law firm management module 135.

Patent strategy module 140 can include identify patent families module 141, link patents to IP and consumer products/technology module 142, patent age analysis 143, return-on-asset analysis module 144, patent web analysis 145, and competitor analysis module 146.

IP licensing management module 150 can include contract management module 151. In an embodiment, contract management module 151 can include sub-modules such as a trademark agreements sub-module, a non-disclosure agreements ("NDA") sub-module, a patent and technology licensing deals sub-module, and so on. IP licensing management module 150 can also include a savings analysis module 152, an agreement locator module 153, and an automated reporting and notification module 154.

For example, the embodiment illustrated in FIGS. 1 and 2 can include data records to store a inventor profiles, a file history for each invention disclosure, and so on. Users can have a sign-on (e.g., user name, password, etc.) to access the system. When an invention disclosure is received via an e-mail submission, the system can put a disclosure number in the subject line (and/or have the system search the text/body of the email for a disclosure number) and/or include the name of the inventor in the subject line. The system would then create a link or place the email in the disclosure data record and under the inventor's profile.

A task list/information page can be created and/or displayed for each user where all the e-mail submissions are stored with a marker such as (i) Complete; (ii) Hold; (iii) Resolved; and (iv) Forwarded. Each marker can include a button (e.g., a graphical user interface hyperlink button) that can be selected when a user has reviewed the e-mail submission. If the Complete button is selected and activated the e-mail submission can drop off of the task list/information page (e.g., after a set period of time, be forwarded under the appropriate disclosure/inventor profile, etc.). Users can also have an option of forwarding other emails to their task list/information page. In an embodiment, additional categories can be created for emails to go into such as Disclosure Meeting Scheduling, Disclosure Status, and so on.

As another example, a disclosure review module can track and manage information so that a report is generated from the disclosures submitted. The report can notate an assessment of the strength of the invention disclosure such as:

1. Very Good—schedule Now/Priority
2. Marketing Priority
3. OK
4. Not Enough Information—Needs a Call
5. No—Rejection Letter Generated The rejection letter can include sample language regarding one or more of the following subjects:

- explaining that based on the content of the submission, there did not appear to be an invention;
- distinguishing an invention from an idea;
- giving an example of the proper way to submit an invention disclosure; and
- inviting the submitter to resubmit the invention disclosure if, based on the definition of invention and/or additional information, they have an invention.

The report can also include a review that assesses the concept (e.g., from an understanding standpoint) and the relevant prior art. In an embodiment, after such as report is generated, it can be linked or sent to a disclosure meeting scheduling module.

In an embodiment, the system can include a disclosure meeting scheduling module that allows auto report generation. The disclosure meeting scheduling report can include information regarding the meeting date and time, the responsible law firm or patent attorney, the invention disclosure case number, and so on. For example, the disclosure meeting scheduling module can retrieve information from the system to include in the disclosure meeting scheduling report such as the disclosure title, a list of all inventors, an identification of attending inventor together with their telephone number, e-mail address, mobile e-mail device address. The report can specify whether the meeting will be a face-to-face meeting, a conference call, a video conference, and so on. The disclosure meeting scheduling module can also send an e-mail to each user, inventor, or customer including the report or information from the report so that the appropriate scheduling analysis and adjustment can be undertaken.

As another example, the system can also include a preliminary disclosure meeting report module to generate a preliminary report regarding the disclosure meeting. Information that can be included in the preliminary disclosure meeting report may include an indication that the meeting was successfully conducted, whether a follow-up meeting is required, the name(s) of the patent attorneys or agents that attended the meeting, whether any potential statutory bar dates were determined, and so on.

An innovation awards/patent disclosure system module or modules can include an identification of each inventor or innovator so that each inventor or innovators contributions can be tracked and recognized. For example, a company may award employees or other inventors bonuses based on invention disclosures, patent application filings, and/or allowed patents.

Also, the innovation awards/patent disclosure system module can accommodate changes to inventorship by notifying individuals who have been added or deleted since the original submission of the invention disclosure. In an embodiment, the system will gray out the name (such that it's still visible but clear someone has been deleted, include a comment field next to name indicating "Reason for Change" and "Authorized/Verified by," allow the user making the change to enter a reason for the change, capture the date the change was made, capture the initials of the user (e.g., administrator) making the change, and send a notice to the individual that he/she has been removed from the invention disclosure for the reason set forth in the comment field.

The system can also highlight if someone has been added since the original submission (e.g., by bolding or underlining the name of the added inventor or innovator), include a comment field next to name indicating "Reason for Change" and "Authorized/Verified by," allow the person making the change to enter a reason for the change, capture the date the change was made, capture the initials of the administrator making the change.

The innovation awards/patent disclosure system module or modules can also include information to control payments or disbursements of innovation awards. For example, the innovation awards/patent disclosure system module can access a data record that includes one or more payment approval fields that require one or more users (e.g., a director of technology, an IP counsel, etc.) to approve payment of an innovation award. The approval can be conditioned, for example, on the innovator's employment status (e.g., at time of submission, at time of invention disclosure meeting, at time of filing of the IP application, etc.) on whether the assignment and declaration have been signed, whether the inventor comments were provided based on a draft application prepared by an IP counsel or agent (e.g., in-house counsel, outside counsel, etc.).

In an embodiment, the system can notify the newly added person just as if he/she would have been notified at the time of the original submission of the invention disclosure. For example, the notification can identify each listed inventor on the disclosure, the title of the invention, the invention disclosure number, the date the submission was received or the date the inventor change was made. When a newly added person is not already in the system, an inventor profile can be created and an inventor ID can be assigned and sent to the newly added inventor (e.g., via his or her email address). In an embodiment, the new inventor's profile must be created and completed before any award payments are made (as well as meeting the payment approval conditions recited above).

A patent disclosure system module in accordance with an embodiment of the present invention can track and manage information related to, among other things, managing a law firm's preparation and prosecution of applications based on invention disclosures. In an embodiment, the patent disclosure system module includes a marker that identifies provisional patent applications that have enough information (e.g., no further information regarding additional embodiments was strategically necessary) to be converted and filed as regular patent applications. The patent disclosure system module can generate a law firm management report that includes information such as:

cycle time;

list of all disclosures at a law firm;

list of disclosures on hold with comment field for reason; and list of closed disclosures.

In an embodiment, the patent disclosure system module can include or be coupled to an innovation disclosure module that can track and manage information related to invention disclosures. For example, the innovation disclosure module can allow an inventor to search a database of invention disclosures to ascertain what has already been submitted. An inventor can thereby access information related to the internal (e.g., intra-company) novelty and/or non-obviousness of an innovation disclosure. The innovation disclosure module also can allow a user (e.g., an intellectual property asset manager) to search the database of invention disclosures to ensure that a newly-submitted invention disclosure is not a duplicate and/or is novel and non-obvious as compared to prior invention disclosures.

Figure 3:
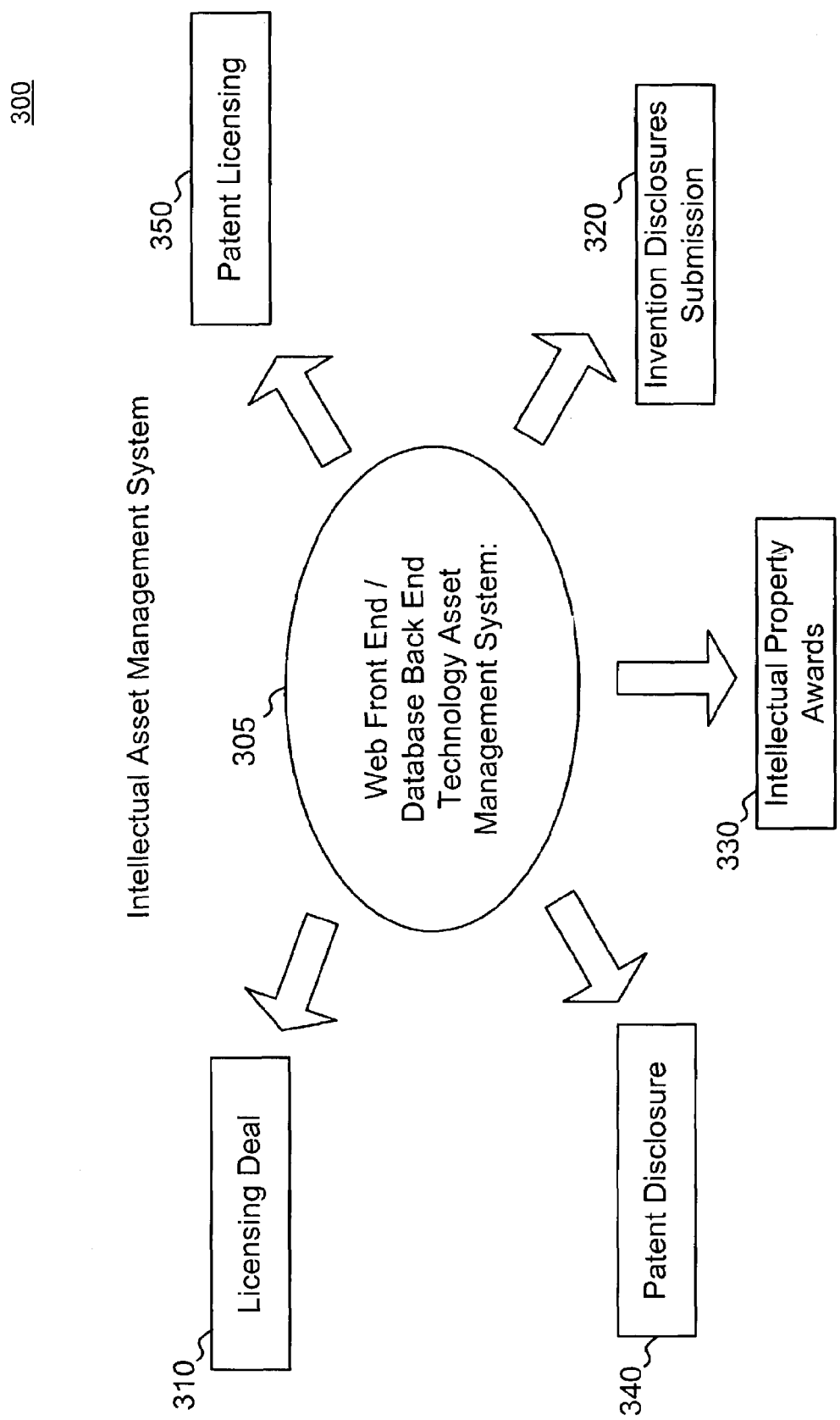
FIG. 3 is a high-level schematic of a system in accordance with another embodiment of the present invention.

FIG. 3 is a high-level schematic of a system in accordance with another embodiment of the present invention. An intellectual asset management system 300, in an embodiment, includes a web front end/database back end 305 coupled to a licensing deal database module 310, an invention disclosures submissions database module 320, an intellectual property awards database module 330, a patent disclosure database module 340, and a patent licensing database module 350.

Figure 4A:
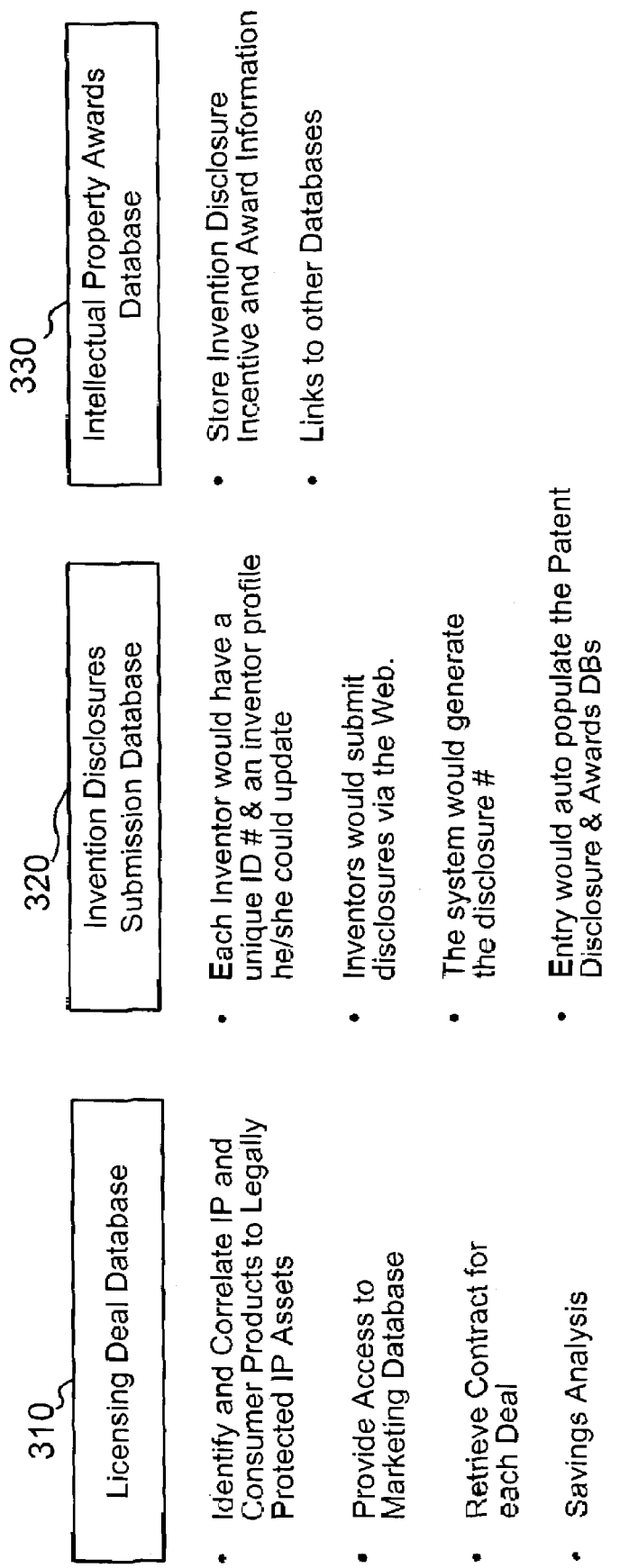
FIGS. 4A-4B are schematics of modules illustrated in FIG. 3.
Figure 4B:
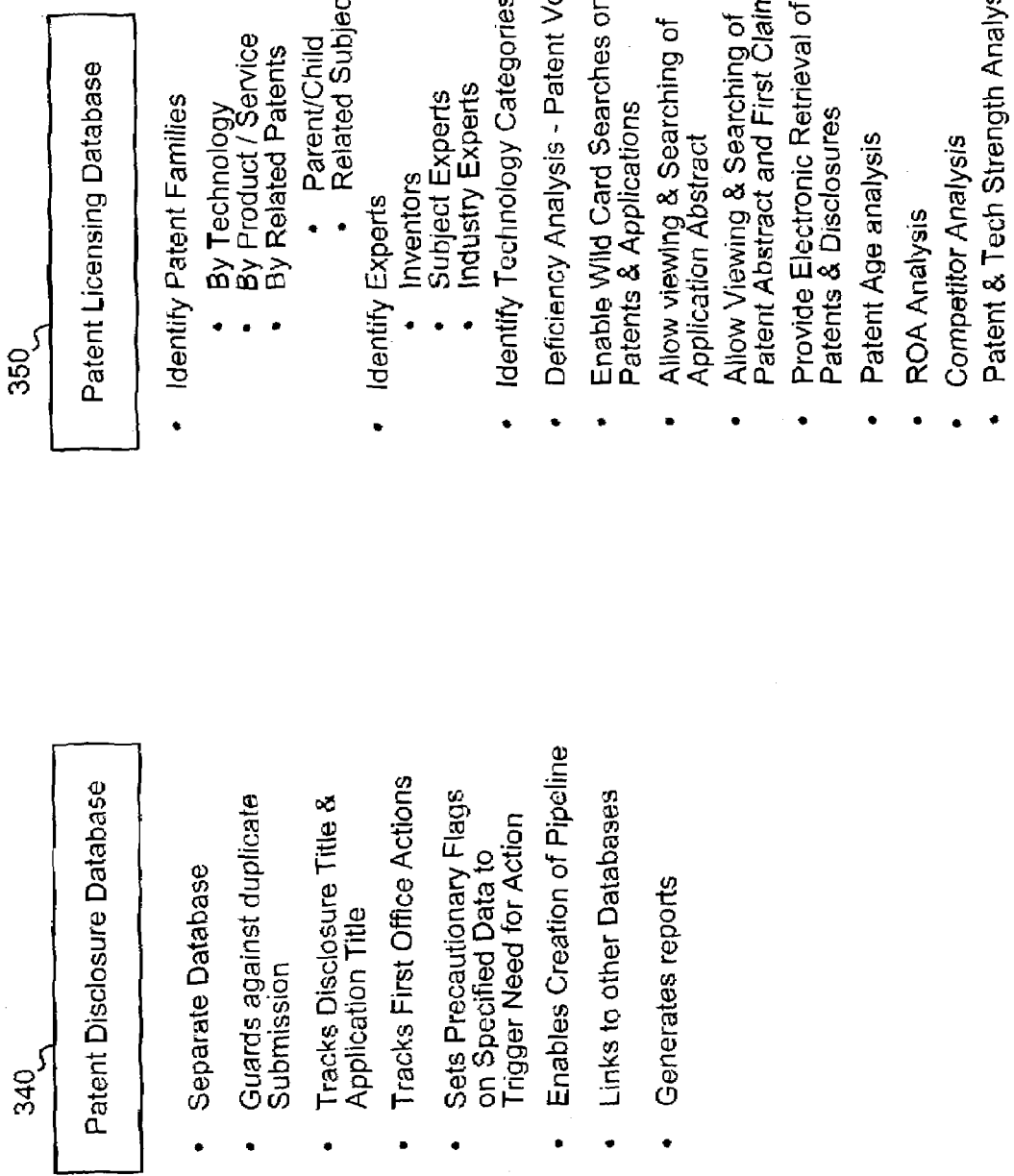

FIGS. 4A-4B are schematics illustrating the database modules shown in FIG. 3. For example, licensing deal database 310 can include modules to: (i) identify and correlate IP and consumer products to legally protected IP assets; (ii) provide access to marketing database(s); (iii) retrieve contract(s) for each deal; (iv) analyze savings; and (v) locate agreement(s). As another example, invention disclosures submission database system 320 can include that (i) each inventor has a unique ID number and an inventor profile that can be updated by the inventor; (ii) inventor can submit disclosures via the Web; (iii) a disclosure number for each disclosure is generated; and (iv) information and data related to the submitted disclosure can auto populate a patent disclosure and awards database. In an embodiment, an intellectual property award database 330 stores invention disclosure incentive and award information and contains links to other databases. Patent disclosure database 340 can: (i) be separate from other databases (e.g., a legal database); (ii) guard against duplicate submissions; (iii) track disclosure titles and application titles; (iv) track first office actions; (v) set precautionary flags on specified data to trigger need for action; (vi) enables creation of a pipeline; (vii) includes links to other databases; and (viii) generates reports. Patent licensing database 350 can (i) identify patent families (e.g., by technology, by product/service, by related patents such as parent/child or related subject, etc.) (ii) identify experts (e.g., inventors, subject experts, industry experts, etc.); (iii) identify technology categories; (iv) deficiency analysis—patent voids; (v) enable wild card searches on patents and applications; (vi) allow viewing and searching of application abstracts; (vii) allow viewing and searching of patent abstract and first claim; (viii) provide electronic retrieval of patents and disclosures; (ix) conduct patent age analyses; (x) conduct Return On Asset ("ROA") analyses; (xi) conduct competitor analyses; and (xii) conduct patent and technical strength analysis.

In accordance with an embodiment of the present invention, an invention disclosure form ("IDF") is submitted. The IDF can explain that the United States is a "first to invent" patent system (unlike most countries which are "first to file" systems) and strongly encourage the inventor to formally document and submit the invention disclosure as soon as possible after the inventor(s) conceive the idea. The IDF can note that writing and submitting an effective invention disclosure is an essential step in protecting a company's intellectual property. This form can be used to communicate potentially useful innovations to the IP department of the company. The IDF allows the submitter to attach additional documents at the time of submission. Once submitted, the documents are associated with the record in TAMS.

In an embodiment, the IDF is a the Web-based IDF and to access the IDF the submitter (e.g., inventor) needs an email address, a user ID, or an Inventor ID number ("IIDN"). If the submitter does not have an IIDN, he/she will be prompted to enter/create the profile information. He/she will then be allowed to proceed with the process. If the submitter is not one of the inventors, the submitter should use the information of one of the inventors.

To enter inventor information on the disclosure form the submitter can enter a valid company email address. If one is not available, the submitter can enter the inventor's info in this sample format:

firstname.lastname@IP.com

When the system recognizes the @IP.com format:

1. It will drop a list of all inventors in database with the same last name. The drop down list will include full name & company phone number. The system will allow the submitter to select from the list or select "No". If "no" is selected, the system will prompt submitter to create inventor profile. Once either method is completed, the system will allow the submitter to continue with the rest of the form.

2. It will know not to send correspondence to this inventor via email. But instead will generate letter & mailing label to send via company mail.

3. A report will be/can be generated periodically allowing the IP department to check list and update inventor if a valid company email address is ultimately issued. The report should show, inventor's name, Inventor ID number, and @IP.com format. The system allows the IP department to link inventor profile to valid company email address, without it creating a new inventor ID, if one becomes available. In an embodiment, a system is needed that uses unique identifying information for inventors, yet the information can be common enough that another individual could submit on his/her behalf. Accordingly, the Firstname.Lastname@IP.com format was created.

The IDF can include a link to a document that explains what is an invention disclosure and how to write an effective invention disclosure. The IDF can include or prompt to 1.) Enter a Descriptive Name of the Invention (e.g., limited to ten words and have a Hyperlink "Descriptive Name" link that gives examples of appropriate and inappropriate titles).

2) Enter Total Number of Inventors. In an embodiment, if there are more than 4 inventors, each listed inventor will be interviewed before a patent application is filed to determine true inventorship.

3) Provide Inventor Name and Email Address (e.g., an can have a link to "Who is an Inventor?" document that explains the technical and legal factors considered with respect to determining who is an inventor).

4) Input or list any company employees, who are not co-inventors but who are familiar with this subject matter.

5) List 3-4 keywords associated with this invention. For example, a key word is a term illustrating the subject matter of the invention and the key words can be separated by a comma.

6) Technology Categories: (e.g., inventors can select from a given list used in disclosure marketing surveys)

A Description of the Invention section of the IDF can include or prompt for the following subjects and categories of information.

A. Type of Invention
1. Is the invention a: [drop down menu]
Way of doing business (process/business method)
software
hardware
equipment
service(s)
test tools
method of manufacture
other B. Problem to be Solved
1. Describe the problem(s) to be solved.
2. Provide, to the extent already known, a brief description of how the problem has been addressed in the past by the company or others, and include for each approach the limitations and disadvantages of what's been done in the past to solve this problem.
3. Describe how does the invention advantageously solve the problem(s)?

C. Uses
1. What are possible uses for the invention (in or outside the particular field or application area)?

D. How Does the Invention Work?
1. Please describe the components involved in the invention, the operation, and how they work together to solve the problem?
2. Please describe the sequential steps involved in your invention, identify the result of each interim step and how each result is used in the next step to ultimately solve the problem.

In an embodiment, the IDF must include at least one drawing of the invention. The inventors can be instructed that (i) referring to it throughout your description is extremely helpful; (ii) the drawing does not have to be formal, only legible and (iii) may be submitted electronically as part of this form or in hard copy as described in the instructions which follow at the end of this document. IDF instructions can explain that the inventor may use pre-existing documents or diagrams (e.g., an existing presentation), provided that the materials sufficiently describe the components/steps of the invention.

E. Inventiveness
1. What features of the invention are believed to be new or provide the improvement over what has been done before to solve this problem(s)?

F. Related Subject Matter
1. List the closest known technology and similar products.
2. If the inventor is able to provide information on related technology, please describe how the invention differs from that technology and similar product(s).
3. Have any other disclosures related to this invention been previously submitted? Yes/No? [drop down menu of Yes/No]
If yes:
Please list the Invention Disclosure Number(s) and Invention name(s) of any related previously submitted inventions(s)
Public Disclosure 8) Has the invention been used or disclosed outside the company? Yes/No? [drop down menu of Yes/No]
If yes:
Provide Date
Please briefly describe the circumstances (e.g., trade show, presentation, technical paper, field test, offered for sale, under confidentially agreement, etc.) and give the date (s) for each.

9) If previously not used or disclosed outside of company, when do you anticipate it will be used or disclosed (deployment date, trial date, public disclosure, offered for sale)? (if known)

10) Date the invention was first built and tested internally or under confidentially agreement including prototypes.
Provide Date
Please briefly describe circumstances 11) Has the invention been offered for sale? (Yes/No)? [drop down menu of Yes/No]
If yes:
Provide Date 12) Did the invention result from work on a development contract with another company/person? Yes/No? [drop down menu of Yes/No]

If yes:

Who was the contracting (Company/Person)?

What was the name of the contract or project?

Internal Tracking Information

13) List the company project and business unit names or acronyms?

A project is usually a team initiative whereby a process, product, or service could be an outcome. If no or unsure, please leave blank 14) Will/Could this disclosure ever be used in a company consumer product or service? [drop down menu of Yes/No-Unsure]

Please explain.

15) Does this invention have any money-making potential and if so please describe and identify the most likely interested party. How do you see this fitting in a company business plan?

The IDF can also include submission instructions, such as the following:

I. Attach additional documents such as drawings, sketches, photographs, patent applications or any other descriptive material that would help us better understand the invention and/or where it stands relative to other technologies or similar products.

II. If additional documentation needs to be forwarded separately, please reference the disclosure number (which will be given once this form is submitted). Please send such documents to <name> at <name-email>@company.com or fax to (404) 555-1212.

III. When you click on the SUBMIT Form button, the contents of this completed disclosure form will be sent via internet or intranet to the IP department technology asset management system. Each listed inventor will receive confirmation of receipt and the assigned invention disclosure number via your provided email address(es).

IV. If you have any questions about the disclosure submission process, please call <name> at (404) 555-1212.

In a Web-based or computer-based version of an IDF, hyperlinks, such as [Submit Form] or [Save Form] or [Reset Form] can be included. The IDF can also include instructions or conditions such as: (i) contains private and/or proprietary information; and (ii) may only be used for authorized business purposes and only by authorized individuals. The IDF may also include hyperlinks such as [Link to Invention Disclosure Process] or [Link to Status Page].

In an embodiment, when the IDF is submitted, an internal report can be generated based on certain answer. For example, an internal report can be generated identifying those disclosures with a yes response to question 11 and periodically (e.g., once per quarter, etc.), this compiled report would be sent via email directly to an appropriate entity (e.g., person, department, etc.). As another example, an internal report can be generated identifying those disclosures with a yes response to question 12.

In another embodiment, the system includes a word counter for the "Description of the Invention" section. The counter would be based on the number words entered in the fields for items C, D, and E. If the combined total of words (characters) is not at least 100, when the submit button is depressed, it won't be submitted. Instead, a message will pop up which will tell the inventor something to the effect that "There may not be enough information to adequately review the patentable potential of your submission. Please review sections C, D, & E and try again." In an embodiment, regardless of what, if anything, is added, we want the disclosure to go thru when the submit button is depressed the second time and also provide each inventor with a copy of the submitted disclosure form In an embodiment, the system includes a technical terminology glossary/database. For example, the system can flag unidentified words in sections B, C, D, and E. If an unidentified word is detected, a pop up screen/field can ask the inventor to define it. The inventor will enter his/her response in that pop up field. The pop up field will occur each time it flags an unidentified word or acronym. The inventor will not be able to proceed unless this field is populated. The system will append the definitions at the bottom of the disclosure.

According to another embodiment, the system will also build or supplement the technical terminology glossary/database. Such that once that word/acronym has been identified, it will not demand a definition BUT will present the word with the definition that has been entered most frequently. The popup screen would ask the inventor if this is the definition that applies? If yes, the inventor can proceed. If no, the inventor should enter a definition as it relates to their subject matter. The system will accept it and append to the end of his/her disclosure, as described above. In an embodiment, the system will retain all definitions entered, but will only show the one entered most frequently.

Once an IDF submission has been accepted by the system, a notice should pop up that the disclosure was successfully received. The system should give the inventor a disclosure number at the conclusion of the process. The system should then send each listed inventor a confirmation letter informing them of:

Each listed inventor on the disclosure

Title of the Invention

Invention Disclosure Number

Date the submission was received

Each inventor's unique inventor ID number with a reminder of the need to use it to check the status of this or any submitted disclosure A copy of the actual disclosure form The next step in the process Notification sent to any new inventor who has had a profile created along with the their inventor ID number and the need to use it in correspondence with us (disclosure number & inventor ID number)

As indicated above, in an embodiment, the system can accept attachments as part of the submission. Due to the complexity of certain embodiments of a disclosure form, the system will allow the inventor to save their work and come back to it later, if they can't complete everything at one time. However, the system will only "submit" the disclosure to the IP department once all required fields are completed.

An embodiment of the present invention can include a system "override". There are times when a disclosure form will not exist (e.g., when a disclosure splits into multiple disclosures, when a Continuation Application or Divisional Application is filed, or when a disclosure is initially revealed to the attorneys at a disclosure meeting, etc.). All of these occurrences still mandate the need of a disclosure number being assigned and the existence of the "disclosure" being captured by the system.

Description of High-Level Business Requirements

The high-level business requirements for an embodiment of the present invention are now described. A business problem to be solved in accordance with an embodiment of the present invention includes the need to track and manage the complete life cycle of the invention disclosure process and its correlation between a company's technology assets and licensing initiatives, including, for example

- To effectively manage the receipt and initial processing stage of an invention
- To determine quickly and accurately the status of a disclosure or technology asset in the patent prosecution/invention disclosure cycle.
- To reveal the correlation among all legally protected intellectual property (IP) assets.
- To develop a user-friendly communication tool that allows independent search, submission, and review by our customers (inventors, employees, and IP Coordinators)
- To develop a system which will effectively and automatically communicate necessary information at the appropriate (pre-determined) time.
- To develop a system that will calculate and track the value of company patents.
- To develop a system that will ensure IDS compliance with the USPTO.

A company's patent portfolio can steadily increase, where the portfolio consists of non-filed invention disclosures, patent applications and issued patents. Federal law mandates that each patent application filed with the USPTO disclose related, co-pending and pending applications. A misrepresentation, failure to disclose, or submission of false information could result in the company's patents being rendered invalid. This condition would not only adversely expose the corporation to weaker prospects in patent litigations, but it would also severely restrict the company's ability to successfully license our intellectual property. For these reasons, there exists a need to develop the integrated IDS compliance system.

The following table illustrates the types of benefits and measures that correspond to an embodiment of the present invention, i.e., a technology asset management system ("TAMS").

| Type of Benefit | Measures |
| --- | --- |
| Increased sales revenue | TAMS is a system which manages technology from innovation to profits by identifying and correlating IP and consumer products to legally protected IP assets. It enables the company to better valuate patents and technology thereby maximizing generated revenue. |
| Work reduction | Through its automated emailing and tracking functionality, TAMS will significantly reduce the workload of current person by hundreds of man-hours and eliminate the current need for additional headcount. |
| Expense reduction | In order to comply with federal laws, a system of this scope is necessary. Systems currently in existence do not conform to the specific needs of the company's patent program and they are cost prohibitive during this economic climate. TAMS yields the exact functionality at very low costs. |
| Cycle time reduction | Patent prosecution is an extremely time sensitive process. Our ability to respond to numerous deadlines is critical in protecting the company's intellectual property. A major component of TAMS is to reduce prosecution cycle time by up to 4 weeks of our current 13 week cycle time. Missed deadlines can be the difference between obtaining a patent and being barred from seeking patent protection. The ability to effectively reduce cycle time is critical in our business. |
| Customer satisfaction | The success of patent program depends on the company's inventors. The patent prosecution is at least a 36-month process from the time an inventor submits an invention disclosure. Effective communication is critical as the inventor navigates through the process. Our current personnel are unable to adequately manage the level of communication necessary with our inventors. TAMS is designed to effectively address this concern. |
| Increased quality | The integration of TAMS ensures increased quality of the company's patent program. With its focus on work, expense, and cycle time reduction merged with increased revenues and customer satisfaction, the system as defined significantly increases the quality of the patent program. |
| Employee satisfaction | The primary IP department users of TAMS are charged with the legal obligation to abide by federal law. The seamless integration provided by this system will provide employee satisfaction. |

According to an embodiment of the present invention, business methods can provide technology asset management. For example, 1. A company employee goes to a web server using an IP department intranet site 2. He/she would create a profile in order to acquire a user name and password 3. The user name & password would be emailed back to the employee 4. Once received, he/she would then be able to go to the web server, via the IP intranet site, and submit an invention disclosure.
   - a. The interactive invention disclosure form requests the name & email address of each co-inventor.
   - b. If the system did not recognize the email address from the centralized database, it would provide a drop down list of everyone in the database with the same last name.

c. The submitter would select the appropriate name or create the profile for the co-inventor if his/her name does not appear in the drop down list.
   i. The system would allow the submitter to continue entering the form, but would also
   ii. Send an email to the co-inventor, whose profile was just created, informing him/her of their username & password to be used
d. The submitter would complete the disclosure form, attach any supporting documentation for the invention, and hit the submit button
   i. Or save the disclosure if he/she needs to come back at a later time to finish
   ii. If he/she chooses to "save" the disclosure, the system would give a tracking number so that the submitter could recall his entry at a later time.
   iii. If the submitter selects "submit", the system does a check to see that required fields are completed (to ensure the quality of the submission and to aid the submitter in determining if he/she has enough information to be considered an invention)

5. Once submitted, the system would automatically email a notice of receipt to each listed inventor on the disclosure form.

6. Once an inventor has a user name & password, he/she could:
   a. Check disclosure titles in the database to see if a similar or exact invention has already been submitted (to avoid duplicate submissions)
   b. Check the status of his/her invention disclosure (there are five stages in the process)
   c. Check the status of his/her innovation award payment 7. Once received, the system would:
   a. Assign a the company disclosure number to the invention
   b. Populate the database with the disclosure number, disclosure title, names of the inventor(s), and Assign a status of "OPEN" in the database
   c. Create a folder, on our internal drive, and place all the files associated with that disclosure number
   d. Certain text of the disclosure form would go to specific areas of the Patent Strategy component of the database.
   e. Determine which Submission gift each listed inventor should receive
   f. Automatically generate and email a confirmation letter which would include:
      i. The name of each listed inventor
      ii. The disclosure title
      iii. The disclosure number
      iv. The appropriate gift that particular inventor will receive
      v. Explanation of the patent process
      vi. Notice regarding inventorship issues & request to update profiles if necessary.
      vii. Reminder to use user name and password 8. Weekly reports are generated of newly submitted disclosures.

9. A Disclosure Review System is implemented to allow for:
   a. Marketing Lead & Processing Lead
   b. Priority Setting
   c. Disclosure Meeting Scheduling
   d. File History of the Disclosure 10. An Innovation Award Module can provide or include:
Track Award Payments & Eligibility
Customer's Independent Status Review
Automated Disclosure Submission Notification & Award Payment Processing
Automated Reporting System 11. A Portfolio Management Module can include or provide:
Disclosure Analysis
Patent Prosecution Tracking
IDS Compliance System
Integrated External Links & Downloads
Law Firm Management 12. A Patent Strategy Module can provide or include:
Identify Patent Families
Link Patents to IP & Consumer Products/Technology
Patent Age Analysis
Return-on-Asset Analysis
Patent Web Analysis
Competitor Analysis 13. An IP Licensing Management Module can provide or include:
Contract Management
Trademark Agreements
Non-Disclosure Agreements
Patent & Technology Licensing Deals
Savings Analysis
Agreement Locator
Automated Reporting & Notification
ASP (Active Server Pages) Application.

An embodiment of the present invention includes an ASP application. For example, a TAMS application can be written in ASP 3.0 and is proposed to be hosted on a server. This embodiment can be a standard ASP application created in MS Visual Interdev, server side VB Script and use ActiveX Data Objects ("ADO") to attach to a back end database. The back end database is created in MS Access 2000 .mdb format and can be upsized as required. In an embodiment, the application will require access to a mail server for outgoing auto-response and status update e-mails. The application can be internal to the Intellectual Property department apart from the Inventor Submissions and Processing web interface. This module can be hosted on a company intranet and available to all company employees. An embodiment can accommodate at least 8-10 unique employee submissions/queries per week. An 'Inventor Web interface' can require an Inventor to Login using their IP User Name (e.g., e-mail address) and a 5 digit password (e.g., an IP department assigned 'Inventor ID Number'). The system can send reminder e-mails to registered Inventors who forget their password. Security can be enforced by the creation of an ASP session level variable after a successful login. This variable will be tested for in every secure page and use a response.redirect if the variable is not found. This will allow an Inventor once logged in to view only their personal IP data—the web consists of three main sections: (i) Maintain Profile; (ii) Submit Disclosure; and (iii) Disclosure Status.

Figure 5:
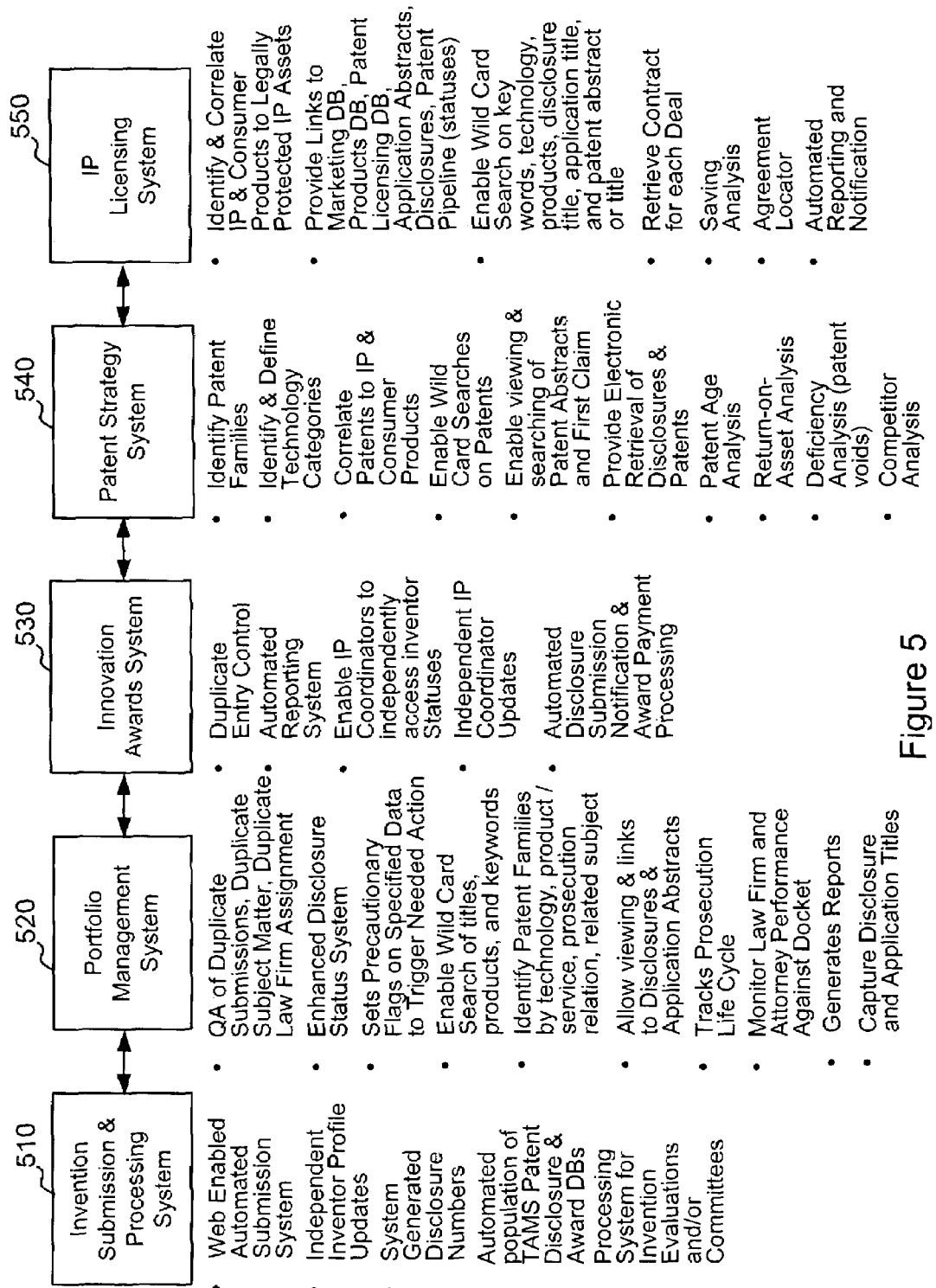
FIG. 5 illustrates another embodiment of the present invention.

FIG. 5 illustrates another embodiment of the present invention. A technology asset management system includes a plurality of interconnected systems such as invention submission processing system 510, a portfolio management system 520, an innovation awards system 530, a patent strategy system 540, and an IP licensing system 550.

In an embodiment, invention submission processing system 510 can include a web enabled automated submission system module, an independent inventor profile updates module, a system generated disclosure numbers automated population of patent disclosure & award databases module, and a processing system for invention evaluators and/or IP committee(s) module.

A portfolio management system 520 can include a quality assurance of duplicate submissions, duplicate subject matter, duplicate law firm assignment module, a means of capturing the disclosure title, and application title, and an enhanced disclosure status system module, a sets precautionary flags on specified data to trigger needed action module, an enable wild card search of titles, products, and keywords module, an identify patent families by technology, product/service, prosecution relation, related subject module, an allow viewing & links to disclosures & application abstracts module, a prosecution life cycle docketing module, a law firm and attorney performance monitoring module, and a reports generating module.

According to an embodiment, an innovation awards system 530 includes a duplicate entry control module, a automated reporting system module, a enable ip coordinators to independently access inventor statuses module, a independent ip coordinator updates module, and a automated disclosure submission notification & award payment processing module.

In another embodiment, a patent strategy system 540, includes an identify patent families module, an identify & define technology categories module, a correlate patents to IP & consumer products module, an enable wild card searches on patents module, an enable viewing & searching of patent abstracts and first claim module, a provide electronic retrieval of disclosures & patents module, a patent age analysis module, a return-on-asset analysis module, a deficiency analysis (patent voids) module, and a competitor analysis module.

An IP licensing system 550, in an embodiment, includes a identify & correlate IP & consumer products to legally protected IP assets module, a provide links to marketing DB, products DB, patent licensing DB, application abstracts, disclosures, patent pipeline (statuses) module, a enable wild card search on key words, technology, products, disclosure title, application title, and patent abstract or title module, a retrieve contract for each deal module, a saving analysis module, a agreement locator module, and an automated reporting and notification module.

Figure 6:
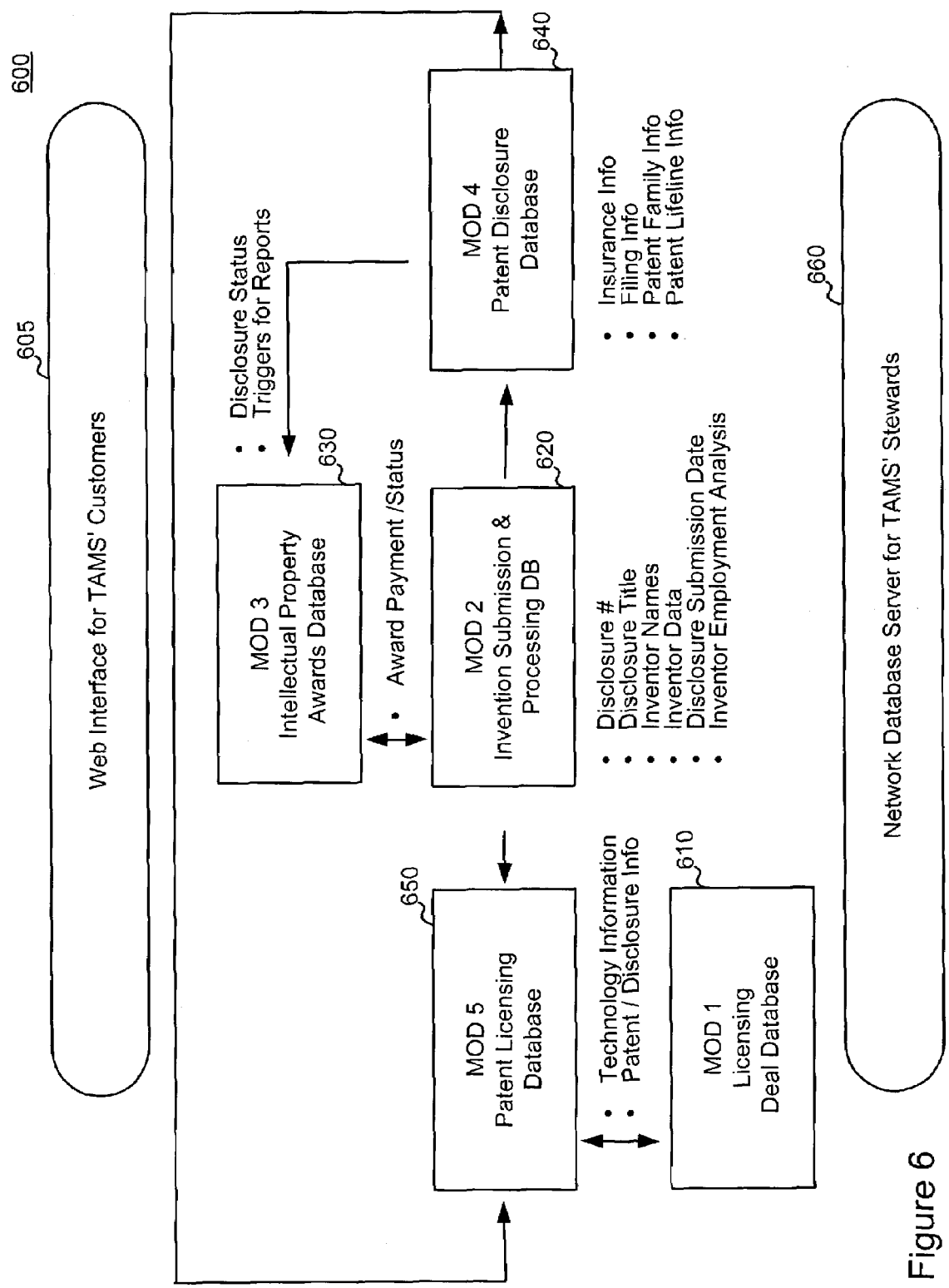
FIG. 6 is an illustration of a system in accordance with a further embodiment of the present invention.

FIG. 6 is an illustration of a system in accordance with a further embodiment of the present invention. An embodiment of the present invention can manage the complete cycle of patent protection and it's interrelation between a company's technology assets and licensing initiatives. The system also includes a self-updating inventor email distribution feature such that inventor profile changes entered by the inventor are automatically captured. This provides an efficient address verification/update process.

System Components

A TAMS system 600 can be comprised of five modules:

| | |
|---|---|
| Module 1 | Licensing Deal Component |
| Module 2 | Invention Submission & Processing Component |
| Module 3 | Innovation Awards Component |
| Module 4 | Patent Disclosure Component |
| Module 5 | Patent Licensing Component |

For example, as illustrated in FIG. 6, technology asset management system 600 includes MOD 1 Licensing Deal Database 610, MOD 2 Invention Submission & Processing Database 620, MOD 3 Intellectual Property Awards Database 630, MOD 4 Patent Disclosure Database 640, and MOD 5 Patent Licensing Database 650. One or more of the modules 610-650 can be coupled to one or more of web interface for TAMS customers 605 and Network Database Server for TAMS' Stewards.

TAMS system 600 can serve one or more of at least four basic functions:
 Patent Protection Tracking,
 Patent Mapping,
 Effective Communication, and
 Valuation Determination.
 Patent Protection Tracking (PPT)

PPT is a comprehensive disclosure-tracking tool to determine quickly and accurately the status of a disclosure(s) or technology in the patent prosecution lifecycle. A submitted disclosure is either active or inactive.

An inactive disclosure is an invention in which the IP department is no longer pursing patentability. The disclosure is either:
 Rejected—Submitted to the IP department but does not meet the IP department filing standard;
 Closed—Disclosure met initial criteria but no longer meets filing standard;
 Abandoned—A file application no longer pursued for patentability.

An active disclosure is an invention in which the IP department is pursing patentability. The active disclosure is either OPEN, Authorized, FILED or Issued.

Patent Mapping (PM)

PM is the relational component of the system. Its initial purpose is to show the correlation among all the company legally protected intellectual property (IP) assets and between those IP assets and the company products (IP products and consumer products). An IP product is a marketable entity pursued by the company Intellectual Marketing Corp (the IP department). A consumer product is a the company development or offering that will be (or is intended to be) marketed to commercial customers. Additionally, PM is an industry analysis tool. It takes the first component—the company interrelation, and incorporates it into the telecommunications industry as a whole. The purpose of this feature is to illustrate the company's technology strengths and weaknesses.

As a unit, the features will:
 Identify Technology Voids to enable technology deficiency analysis
 Provide Focused Protection enabling planned technology development
 Identify Industry Leaders in Particular Technology Areas
 Identify Related Patents and Applications by
  Technology
  Products
  Key Words
  Patent Family (parent/child relationship)
 Effective Communication (EC)

TAMS is a web-enabled system providing user-friendly interaction with the end-user. The data comprising the backbone of the system will be managed in Microsoft Access. All modules have a web interface to ensure ease of use and aesthetic appeal to TAMS users. The system will provide:
 Automated submission of invention disclosures to better inventors and reduce redundancies of submissions and subject matter in the company patent portfolio.
 Enable independent disclosure and award payment status checks by inventors and IP Coordinators
 Links to Existing Databases (IPAD, Patent Disclosure, Marketing, Products); the EXTRANET; Electronic copies of patent applications, issued patents, and invention disclosures
 Ability to perform wild card searches on technology assets Produce tailored reports Valuation Determination (VD)

VD provides methods to calculate and track the value of the company patents based on:

Technology Strength

Patent Strength

Return-on-Asset (ROA) Analysis comprising

Patent Cost

Generated Revenue by the Business Unit developing/using the technology and the IP department who licenses it.

As described above, A TAMS system 600 can be comprised of five modules: a Module 1 Licensing Deal Component 610, a Module 2 Invention Submission & Processing Component 620, a Module 3 Innovation Awards Component 630, a Module 4 Patent Disclosure Component 640, and a Module 5 Patent Licensing Component 650. Each module is described in additional detail hereinafter.

Module 1 Licensing Deal Database 610

Module Description

Identifies and correlates IP and Consumer Products to

Legally Protected IP Assets (mapping products to patents)

Provide Access to:

Marketing Database

Products Database

Patent Licensing Database

Patent Pipeline (disclosure status)

Link to Disclosures on Storage Device

Application abstract/summary

Retrieve Contract for each deal

Savings Analysis

Agreement Locator (individual in Purchasing or Supply Chain who has possession)

Wild Card Search based on:

Disclosure Title

Application Title and Abstract/summary

Patent Title and Abstract/summary

Products

Key Words

Technology Category

Module 2 Invention Submission & Processing System 620

Module Description

This module serves the inventors and Technology Dept in accurately and efficient transcend the initial disclosure process. For the inventor it provides: automated invention disclosure submission, independent inventor profile updating, and independent disclosure and payment status verification. For the IP Protection Entity, the system provides efficient management of those submissions and the ability to control duplicate submissions of disclosures: by same inventor, by different inventors, to different law firms.

Module Components and Functionalities

Embodiment I

1. System assigns a tracking number to the submitted disclosure. The tracking number can be listed in the Subject Line of submitted disclosure.

Sample Tracking Number Formats. The tracking number can be at least a five digit "number" as follows:

| | |
|---|---|
| JAN01 | 1ST interactive disclosure submitted in January |
| FEB04 | 4th interactive disclosure submitted in February |

-continued

| | |
|---|---|
| MAR19 | 19tth interactive disclosure submitted in March |
| APR12 | 12th interactive disclosure submitted in April |
| MAY26 | 26th interactive disclosure submitted in May |
| JUN01 | 1st interactive disclosure submitted in June |
| JUL57 | 57th interactive disclosure submitted in July |
| AUG89 | 29tth interactive disclosure submitted in August |
| SEP03 | 3rd interactive disclosure submitted in September |
| OCT62 | 62nd interactive disclosure submitted in October |
| NOV76 | 76th interactive disclosure submitted in November |
| DEC99 | 99th interactive disclosure submitted in December |

In an embodiment, the letter changes on the first day of each month. If the disclosure is forwarded it gets a tracking number. The system would automatically assign this tracking number and put it in the subject line of the delivered email. In another embodiment the tracking number is a four digit "number" such as the following:

JN01

FB01

MR01

AP01

MY01

JN01

JL01

AG01

SP01

OT01

NV01

DC01

In an embodiment, the tracking number is not visible to the sender (e.g., inventor, forwarder, submitter, etc.). A reason for designating a tracking number is to aid in matching up submitted disclosures without the benefit of a disclosure number and aiding in the determination of the period in time a particular disclosure was submitted.

2. Extract from the submitted disclosure the following information:

Tracking Number of Submitted Disclosure

Names of each Listed Inventor

Work Phone of Each Listed Inventor

Title of the Disclosure

Date Submitted

3. Create a Weekly Submission Report in Excel which is emailed directly to IP department personnel:

a. Report contains extracted info above.

b. Disclosures are listed by Tracking Number

4. Attachments can be submitted and extracted through the interactive form.

5. A Submission Processed Report can list a. Tracking Number (once, not per listed inventor)

b. Disclosure Number (once, not per listed inventor)

c. Title (once, not per listed inventor)

d. Inventor Name (1st & last)

e. Eligible Gift Inventor is to Receive f. Report would contain a 2 blank columns with the following Heading:

i. Priority/Meeting Date ii. Type of Meeting Necessary g. Report Header will include: Report Title, Date Report Created/Completed or Week Ending Period

Embodiment II

Web Enabled Automated Invention Disclosure Submission

Inventor Creates a Profile
Inventor enters email address (unique to each employee)
Inventor hits SUBMIT button
System assigns him/her a unique ID #
System will have inventor create a question/answer profile in case he/she loses the ID #
If inventor does lose, the system can give it to him/her again
the IP department will also receive a list of all ID #s
Inventor can always update his/her profile without submitting a disclosure
Inventor Submits Disclosure
Enters inventor(s) name(s) AND ID #(s)
Entry is similar to interactive form except it automatically populates the database with:
   Disclosure number
   Disclosure Title
   Names of inventor(s)
   OPEN disclosure status
Disclosure goes to storage with disclosure number as the file title
Goes to Patent Disclosure Database:
   Text of the description section
   Disclosure Title
   Inventors
   Disclosure Number
The profile is accessible and linked to the other MODs where appropriate
Any attachments or additional documentation should be sent to the IP department with the disclosure number in the subject line. There will be a link to the storage for a copy/view of the full disclosure. When disclosure is submitted, each listed inventor on the form will receive:
   Confirmation letter with the disclosure # and gift to receive;
   Notification/warning about inventorship and request to address/correct; and
   Notification to send additional documentation to the IP department with the disclosure # in subject line.

Embodiment III

Disclosure Processing

The system will enable QA on identical submissions (by same inventor or different inventors) and identical subject matter submitted by different inventors or same inventors.

If a match is found, system prompts need to clarify difference.

For each submitted disclosure the system will provide:
Tracking #
Marketing Lead
Processing Lead
Disclosure Meeting Scheduling
Priority Setting
Comment fields for reviewers
Follow-Up Field
Prior Art
Inventorship
Draft Response Needed
Formal Papers/Response to Legal Needed
Business Impact
Technical Feasibility
IDS Info Needed
Additional Disclosure Info Needed
Inventor Data Needed
IP Presentation Needed/Requested
   Awareness
   Inventorship
   NDA
Disclosure Meeting Needed
Vendor Relationship
DISCLOSURE (bar date issue)
Review
Processing
   Approved
   Rejected The Invention Submission and Processing Database can also generate reports such as:
   Submission Reports
   Disclosure Meeting Priority Reports
   Follow-Up Reports
   Processed Reports
      Accepted/Rejected
      Gift/Letter Sent (date)
   Disclosure Meeting Schedule
   Disclosure Meeting Status
   Module 3 Intellectual Property Awards Database 630
   Module Description This module is designed to track and manage information related to presenting awards to inventors for generating and submitting invention disclosures. Module 3 includes inventor profile information, gift eligibility and appropriate gift determination for each listed inventor on an invention disclosure form, projection and expense budget analysis, employment status of each listed inventor, award payment eligibility and status of payment for each inventor, and a docket of all submitted disclosures and their life cycle status for each listed inventor.

Module Components

Module 3 incorporates the following components and functions:
   Title search (QA function to control duplicate submissions into the database based on title),
   Automat reports currently generated manually
   Ability of IP Coordinators to check appropriate statuses of their inventors,
   Updating IP Coordinator list/info—adding or deleting individual as necessary
   Providing list of inventors under each Coordinator
   Automatically generate the appropriate gift based on Module 2.
   Generates the letters and labels
   Module 4 Patent Disclosure Database 640
   Module Description This module serves the IP department business and legal community as well as the company inventors. A current database was designed to track patent disclosures from the time they are disclosed to the IP department until they are filed with the US Patent and Trademark Office (PTO). This module tracks patent disclosures from the time they are disclosed to the IP Protection Entity until they are filed with the PTO:
   Tracks the name, title, inventor, and filing information (filing dates, filing numbers, provisional/continuation/divisional, etc.) for a particular case.
   Tracks, other pertinent information such as the marketing effort associated with a disclosure
   Stores law firm information including the lawyer working a particular case and a list of all the cases the lawyer has on his/her docket Additionally, the module is capable of tracking the prosecution life cycle once filed with the PTO.˙.

All info may be searched in a friendly graphical environment. The user may search by disclosure, inventor, or lawyer (e.g. all of the cases for a particular inventor or all of the cases being handled by a particular lawyer or law firm).

Module Components

The MOD 4 incorporates the following components and functions:
- Guards against duplicate submission
- Wild Card Search on Title, Products, Key Words, and Partial Inventor Name
- Capture the Disclosure Title and Application Title
- Track First Office Actions
- Link to EXTRANET
- Links to Electronic Disclosure Files
  - Disclosure
  - Complete Patent Application
  - Correspondence on Disclosure
  - All Formal Papers regarding PTO
- Set Precautionary Flags on Specified Data to Trigger Need for Action
- Enhanced Disclosure Status System enabling Creation of Pipeline The following table show sample disclosure statuses, symbols, and symbol meanings for a disclosure state system pipeline.

Automated Status Update
- When the status changes to closed, the letter is automatically generated:
  - Pulling disclosure #, disclosure title, and inventor name
  - A CLOSED report can be generated
- When the filing date is entered, system automatically changes the status to FILED
- When submission date is entered/disclosure created, system automatically inputs status to OPEN
- When provisional date is entered, system automatically inputs status to PO & creates a target meeting date (4 months out)
- When meeting date entered, status auto changes to Authorized & creates 13 week time line (see Marcus' sheet)

Links to other Databases

Import of shared info from other databases in TAMS

Generation of Reports currently unavailable

Identify Patent Families by:
- Technology
- Product/Service
- Related Applications/Disclosures
  - Parent/Child
  - Related Subject Identify Technology Categories for Applications

| Disclosure Status | Symbol | Meaning |
| --- | --- | --- |
| OPEN | O | Disclosure Received & Processed but no Disclosure Mtg Held |
| Authorized | A | Disclosure Meeting Held w / Attorneys |
| Auth / Draft | AD | Authorized Disclosure w / a 1st Draft Sent to Inventors |
| FILED | F | Application Filed w / USPTO |
| CLOSED | C | the IP department no longer Pursuing Patent Application |
| Auth - On Hold | AO | Law Firm has Placed Application On-Hold |
| Abandoned | AB | Application Filed w / PTO but Case has Gone Abandoned |
| Prov / No Mtg | PO | Provisional Application Filed / But No Disclosure Held |
| Prov / Mtg | PA | Provisional Application Filed / Disclosure Meeting Held / No Ordinary Filing Yet |
| Auth CON | ACON | Authorized Disclosure which is a CONT of another Disclosure |
| Auth CIP | ACIP | Authorized Disclosure that is a Continuation-In-Part of another Disclosure |
| Auth DIV | ADIV | Authorized Disclosure that is a Divisional of another Disclosure |
| Filed CON | FCON | Filed Application that is a Continuation of another Disclosure / Application |
| Filed CIP | FCIP | Filed Application that is a Continuation-In-Part of another Disclosure / Application |
| Filed DIV | FDIV | Filed Application that is a Divisional of another Disclosure / Application |
| No Ord US Filing | PCT-US | PCT Filed Application / But No Ordinary US Filing |
| PCT & Ord US | PCT | PCT Filed Application |
| Granted | GR | Patent Granted / But Not Issued |
| Issued | ISSUE | Patent Issued |
| Ready for Outside Counsel | ROC | The Evaluator(s) and / or IP Committee has recommended patent filing with the PTO |
| Assigned | ASG | Disclosure has been assigned to a firm, atty, or agent for filing but no meeting has been scheduled or performed with the inventor(s) |
| First Office Action | FOA | PTO has mailed a first office action. |

Enable Wild Card Searches on text of Application summary/abstract

Allow viewing & searching of Application Abstract

Link to Electronic Application File (viewing privileges only to most)

Link to Electronic Disclosures

Cost of Filing

The MOD 4 Patent Disclosure Database 640 can also be accessed to generate various reports, such as an inventory pipeline report, a marketing pipeline report, and so on.

1.1 Inventory Pipeline Report

For example, an inventory pipeline report can include one or more of:

Disclosure #;

Disclosure Status;

a Patent Protection Life Cycle legend (see below); and

IP Product No.

In another embodiment, an inventor pipeline report can include one or more of:

Disclosure #;

Title (1st 31 characters);

IP Product No.; and

Disclosure Status.

Examples of Patent Protection Life Cycle Legends ("PPLC Legend") are as follows:

| | |
|---|---|
| L1 | Submission Date |
| L2 | Expected Disclosure Mtg Date |
| L3 | Disclosure Mtg Date |
| L4 | Expected Draft Date |
| L5 | 1st Draft Received |
| L6 | Anticipated Filing Date |
| L7 | Filing Date |
| L8 | 1st Office Action Expected |
| L9 | 1st Office Action Received |
| L10 | Date Granted |
| L11 | Date Issued |
| L12 | No of Days from Submission-to-Disclosure Mtg |
| L13 | No of Days from Mtg-to-Draft |
| L14 | No of Days from Mtg-to-Filing |
| L15 | No of Days from Submission-to-Filing |
| L16 | No of Days from Filing to 1st Office Action |
| L17 | No of Days from Filing to Issuance |

1.2 Marketing Pipeline Report

For example, an inventory pipeline report can include and/or be run by one or more of:

Report Run by:

IP Product List

Consumer Product List

Disclosure #

Report Contains:

Disclosure #

Title (1st 31 characters)

IP Product No/Name

Patent Protection Life-Cycle (see 1.1)

Disclosure Status

IP Product Name

Consumer Product Name

TAMS Reports for Modules 1-5:

According to an embodiment of the present invention, all reports generated by TAMS has the ability to include the following fields and sort by the following fields:

Law Firm, Attorney, Company File Number, Affiliate, Dept Head, Date Ranges, Application Type, Key Words, Inventor, Priority, Evaluation Status, Product Name, Technology Category, Event, Disclosure Title, Application Title, Observation Title I. Cycle Time Reports:

BIPMAN/Law Firm Management

A. Life Cycle of Filed Patents and Issued Patents by year: total and per law firm No of Days from OPEN date to:

Ready for Outside Counsel

Assigned

Meeting Date

Draft Received Date

Filing Date $1^{st}$ Office Action

Issuance

No of Days from Ready for Outside Counsel to:

Assigned

Meeting Date

Draft Received Date

Filing Date $1^{st}$ Office Action

Issuance

No of Days from Meeting Date to:

Draft Received Date

Filing Date $1^{st}$ Office Action

Issuance

No of Days from Draft Received Date to:

Filing Date $1^{st}$ Office Action

Issuance

No of Days from Filing Date to:

$1^{st}$ Office Action

Issuance

No of Days from 1 st Office Action to Issuance

No of Days Since Meeting Date

No of Days from Provisional Filing to:

Meeting Date

National Filing Date

B. Report & Graph Target Dates vs Actual Dates Overall and Per Law Firm

Expected Draft Date/1st Draft Received

Anticipated Filing Date/Filing Date

1st Office Action Expected/$1^{st}$ Office Action Received

Provisional Filing/National Patent Filing

C. Monthly/Qrtly/Annual Protection Report

1. Invention Disclosures (YTD Actual/YTD Target)
2. Patent Applications in Progress (YTD)
3. US Patent Applications Filed (YTD Actual/Target)
4. Patents Pending at U.S. Patent Office
5. Patents Issued (YTD Actual/Total)
6. Invention Disclosures Submitted per Business Affiliate D. Cases That Can Be Filed Report of Cases in which a First Draft has been received, but:

The case is not "Filed"

The case is not "Closed"

The case is not "On Hold"

II. Inventor Report

A. Invention Submissions

1. A Cumulative List of Every Inventor who has submitted a disclosure to BIPMAN
2. The report would contain an alphabetical listing of names and the number of disclosures they have submitted. This is not a yearly report, but a cumulative report.
Example:
Invention Submissions
Inventor A (17)
Inventor B (2)
Inventor C
Inventor D (22)
B. Patent Filings
1. A Yearly report of every person who was listed as an inventor on a filed US ordinary application, CIP, and DIV.
2. The report would contain an alphabetical listing of names and the number of filings for the year. This is a yearly report. Example:
2002 Patent Filings
Inventor A
Inventor B (9)
Inventor C (3)
Inventor D
Inventor E (2)
C. Patent Issuances
1. A report of every person who was listed as an inventor on an issued patent in a particular year.
2. The report would contain an alphabetical listing of names and the number of issuances for that year. This is a yearly report. Example:
2002 Patent Issuances
Inventor A
Inventor B (10)
Inventor C (2)
Inventor D (4)
D. Inventor Achievement
1. A report of every person who was listed as an inventor on an issued patent:
$5^{th}$ Issuance,
$10^{th}$ Issuance, and
15th Issuance
2. The report would contain an alphabetical listing of names and the number of issuances for that year. This is a yearly report. Example:
2002 Inventor Achievement
Inventor A ($15^{th}$ Patent)
Inventor B ($5^{th}$ Patent)
E. Publications
1. A report of every person who received a publication award in a given year.
2. The report would contain an alphabetical listing of names and the number of publication awards distributed for that year. This is a yearly report. Example:
2002 Publications
Inventor A
Inventor B (2)
III. Disclosure Genealogy Report
A. Ability to Run Report by:
Disclosure Parent #
Disclosure Child #
Technology Category or Key Word
B. Report Contains:
1) List Parent
　Disclosure #
　Disclosure Title or Application Title
　Current Status
　Filing Date & Issuance Date
　Technology Category and/or Key Word
2) List It's Children
　Disclosure #
　Disclosure Title or Application Title
　Current Status
　Filing Date & Issuance Date
　Technology Category and/or Key Word
IV. Provisional Report
A. Ability to Run Report by:
Company File Number
Provisional Filing Date
Expiration Date: 9 months, 6 months, 3 months, 2 months, 1 month
B. Report Contains:
Company File Number
Provisional Filing Date
Disclosure Meeting Date
Expiration Date
Expected $1^{st}$ Draft Date
Anticipated Filing Date of National Patent
Disclosure Status
Inventor's Home State
V. Issued Report (List)
A. Ability to Run Report by:
Company File Number
Issuance Date
VP/Dept Head's Name
B. Report Contains:
Company File Number
Patent Title
Full Name of each Inventor
Issuance Date
Maintenance Fee Due Dates
Patent Aging Analysis (# of Years Left on Patent)
VI. Individual Patent Report
A. Report Contains:
Patent #
Patent Title
Issuance Date
Application #
Filing Date
Company File Number
OPEN Date
Summary/Abstract
Technology Category
Name of Each Inventor
　Work Phone (or email)
　Total Disclosure Count
　Total Patent Count
　Employment Status
Internal SME
Product Name
Consumer Name
BIPMARK Interest
Key Words
Patent Family Structure (Disclosure Genealogy)
VII. Closed Report
A. Report has counter
1. Report Run by:
　Disclosure #, or
　Date Range
　Reason for "Closed" Status
　Inventor's Name
2. Report Contains:
　Disclosure #
　Disclosure Title
　Inventor(s) Full Name(s)
　Observation: Reason for Closing VIII. Inventor Disclosure Status Report
A. Report Run by:
Disclosure #
Inventor Name
Supervisor
VP/Dept Head
Business Unit
B. Report Contains:
Disclosure #
Disclosure Title
Disclosure Status & Comment, such as the following:
If Status=OPEN,
Then Comment Field="Disclosure Under Technology Review"
If Status=CLOSED,
Then Comment Field=BIPMAN will not pursue patent application.
If Status="Application In Progress",
Then Comment Field=
  Expected Draft Date, and
  "Disclosure Under Legal Review"
If Status=FILED, [on a NP, CIP, or DIV]
Then Comment Field=
  Filing Date, and
  "Examination Process at the USPTO Takes>20 Months", and
  "Payment To Eligible Inventors 6 weeks from Filing Date"
If Status=ISSUED,
Then Comment Field=
  Issuance Date, and
  "Payment To Eligible Inventors 6 weeks from Issuance Date"
IX. Inventor Payment Status Report
A. Report Run by:
Disclosure #
Inventor Name
B. Report Contains:
Disclosure #
Disclosure Title
Disclosure Status
Payment Status & Comment, such as the following:
If Status=OPEN,
Then Comment Field="No Payment Due At this Time"
If Status=CLOSED,
Then Comment Field="No Payment Due"
If Status="Application In Progress",
Then Comment Field="No Payment Due At this Time
If Status=FILED, [on a NP, CIP, or DIV]
Then Comment Field=
  Filing Date, and
  "Payment To Eligible Inventors 6 weeks from Filing Date", &
  "Filing Payment Processed mm/dd/yyyy"
If Status ISSUED,
Then Comment Field=
  Issuance Date, and
  "Payment To Eligible Inventors 6 weeks from Issuance Date", and
  Issuance Payment Processed mm/dd/yyyy"
X. Technology Products Report
A. Report Contains:
IP Product Name
Disclosure Title
Disclosure #
Disclosure Meeting Date
Provisional Filing Date
Filing Date
Date of 1$^{st}$ Office Action
Date of Notice of Allowance
Patent Issued Date
Date Closed
Notes/Comments Field
XI. Valuation Report
For example, a valuation report can include and/or be run by one or more of:
A. Run Report by:
Technology Strength
Patent Strength
B. Report Contains:
Patent #
Patent Title
Issuance Date
Application #
Filing Date
Technology Strength
Patent Strength
Each Inventor's Full Name & Work Phone (or email)

In accordance with another embodiment of the present invention, systems and methods can assist in preparing patents for litigation. It can be important that when a company's patent portfolio is increasing and the company will soon enforce its patents, the company's patents be ready for litigation. A factor relating to whether a patent is ready for litigation includes whether those associated with prosecution of the patent have complied with the duty of disclosure to the PTO. The duty of disclosure relates to submitting to the PTO all information a reasonable examiner would consider important to patentability such as related patents, patents cited in co-pending applications, potentially pending applications, and so on.

Cross-citation of references, patents, and patent applications can assist in readying patents for litigation. In an embodiment of the present invention, a cross-citation Information Disclosure Statement ("IDS") database ("CC IDS DB") stores cross-citation information. A CC IDS DB can interface with outside counsel docketing an information systems so that outside counsel can provide input that the company manages. The CC IDS DB can include records for all company patents and patent applications according to technical and legal classifications. Related applications can be associated, and references can be cross-cited.

In an embodiment, the CC IDS DB can be implemented as part of or coupled to a technology mapping system which can graphically render company IP, overlay applications and patents on a schematic of the technical areas relevant to the company, visually display strengths and weaknesses of the company's IP position, and include comparisons to the IP positions of competitors.

Figure 7:
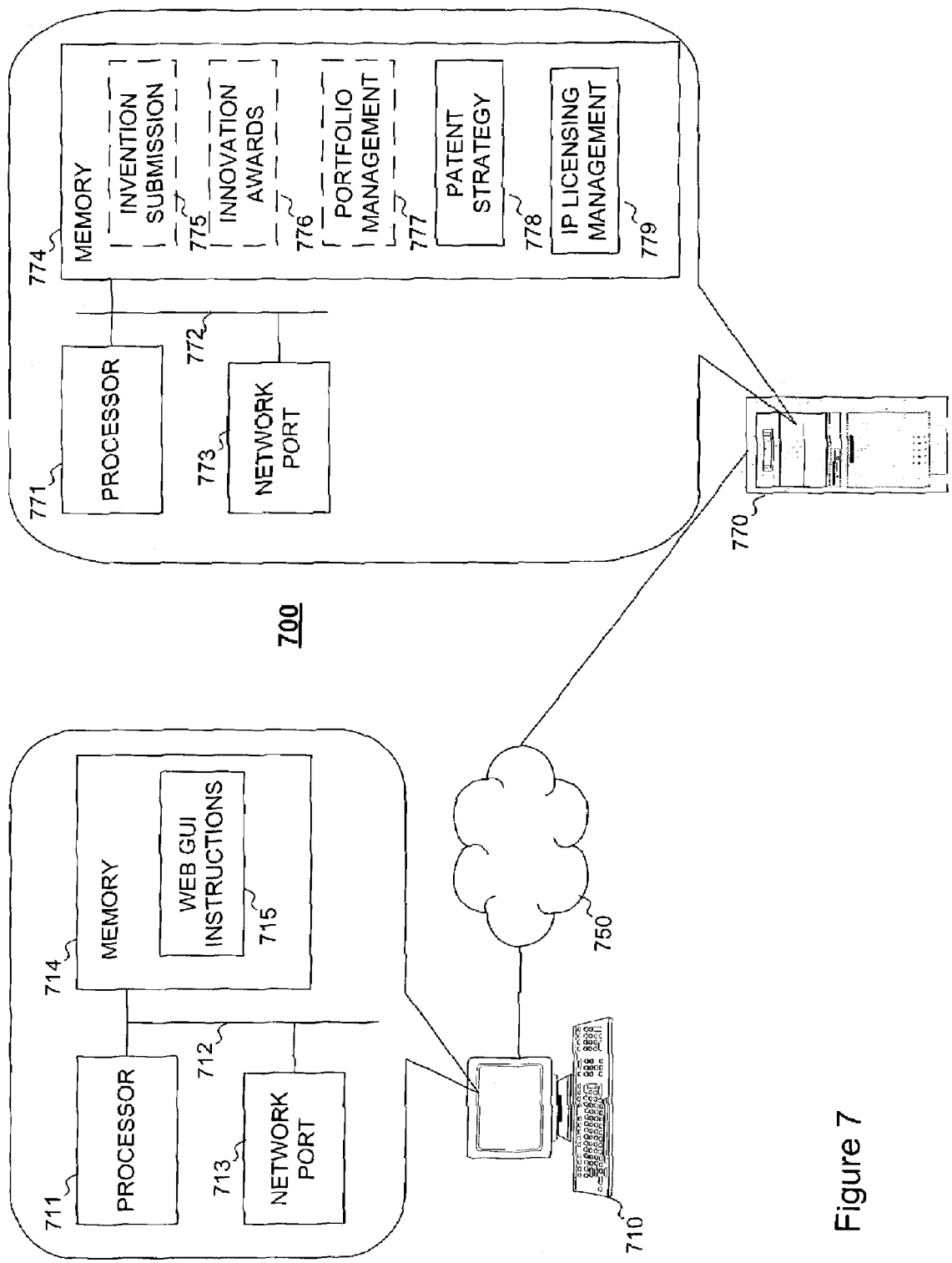
FIG. 7 illustrates another embodiment of the present invention.

FIG. 7 is a schematic diagram of an embodiment of the present invention.

System 700, in an embodiment, includes a computer 710 of a user. Computer 710 can include a processor 711 coupled via bus 712 to network port 713 and memory 714. Processor 711 can be, for example, an Intel Pentium® 4 processor, manufactured by Intel Corp. of Santa Clara, Calif. As another example, processor 711 can be an Application Specific Integrated Circuit (ASIC). An example of bus 712 is a peripheral component interconnect ("PCI") local bus, which is a high performance bus for interconnecting chips (e.g., motherboard chips, mainboard chips, etc.), expansion boards, processor/memory subsystems, and so on.

Network port 713 can be an Ethernet port, a serial port, a parallel port, a Universal Serial Bus ("USB") port, an Institute of Electrical and Electronics Engineers, Inc. ("IEEE") 1394 port, a Small Computer Systems Interface ("SCSI") port, a Personal Computer Memory Card International Association ("PCMCIA") port, and so on. Memory 714 of computer 710 can store a plurality of instructions configured to be executed by processor 711. Memory 714 may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof.

Computer 710 can be coupled to server 770 via network 750. Server 770 can be, for example, a Windows NT server from Hewlett-Packard Company of Palo Alto, Calif., a UNIX server from Sun Microsystems, Inc. of Palo Alto, Calif., and so on. Server 770 can include a processor 771 coupled via bus 772 to network port 773 and memory 774. Examples of network 770 include a Wide Area Network (WAN), a Local Area Network (LAN), the Internet, a wireless network, a wired network, a connection-oriented network, a packet network, an Internet Protocol (IP) network, or a combination thereof.

Server 770 and memory 774 can include a plurality of instructions adapted to be executed by processor 771. The plurality of instructions can include invention submission instructions 775, innovation awards management instructions 776, portfolio management instructions 777, patent strategy management instructions 778, and IP licensing management instructions 779.

Memory 714 of computer 710 can include web graphical user interface ("GUI") instructions 715. In an embodiment, web GUI instructions 715 can be client-side web GUI instructions (e.g., a web browser) that can manage at least in part communications between computer 710 and server 770 (e.g., a world wide web server, etc.). Examples of client-side web graphical user interface instructions include Internet Explorer 5.0 (or another version) from Microsoft Corporation of Redmond, Wash., Netscape Navigator 4.72 (or another version) from Netscape Communications of Mountain View, Calif., and so on.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of systems and methods for technology asset management have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be defined by the claims appended hereto, and by their equivalents.

What is claimed is:

1. A system for technology asset management, the system comprising:
   a web interface accessible through a web browser for technology asset management customers;
   a server back end database to store technology asset management information; and
   one or more of a plurality of intercoupled technology asset management modules selected from the group consisting of an invention submission module, an innovation awards module, a portfolio management module, a patent strategy module, and an intellectual property licensing management module, the one or more technology asset management modules being coupled to the web interface and the server back end database,
   wherein the one or more of the plurality of intercoupled technology asset management modules at least includes the portfolio management module, and wherein the portfolio management module at least includes an outside counsel management module for tracking and managing information related to outside counsel's preparation, prosecution and/or maintenance of at least one patent application.

2. The system of claim 1, wherein the invention submission module includes one or more invention submission submodules selected from the group consisting of a web-enabled automated submission system, an independent inventor profile updates module, a system generated disclosure number module, and an automated technology asset management database population module.

3. The system of claim 1, wherein the innovation awards module includes one or more innovation awards submodules selected from the group consisting of track payments and eligibility module, customer's independent status review module, automated disclosure submission notification and award payment processing module, and automated reporting system module.

4. The system of claim 1, wherein the portfolio management module includes one or more portfolio management sub modules selected from the group consisting of disclosure analysis module, patent prosecution tracking module, Information Disclosure Statement ("IDS") compliance system module, and integrated external links and downloads module.

5. The system of claim 1, wherein the patent strategy module includes one or more patent strategy submodules selected from the group consisting of identify patent families module, link patents to IP and consumer products/technology module, patent age analysis, return-on-asset analysis module, patent web analysis module, and competitor analysis module.

6. The system of claim 1, wherein the intellectual property licensing management module includes one or more intellectual property licensing management submodules selected from the group consisting of contract management module, a savings analysis module, an agreement locator module, and an automated reporting and notification module.

7. The system of claim 6, wherein the contract management module includes one or more contract management submodules selected from the group consisting of a trademark agreements submodule, a non-disclosure agreements ("NDA") submodule, and a patent and technology licensing deals submodule.

8. The system of claim 1, wherein the outside counsel management module generates an outside counsel management report including at least one of a cycle time associated with the patent application and a list of all disclosures associated with the outside counsel.

9. The system of claim 8, wherein the cycle time associated with the patent application includes at least one of a number of days from the patent application being assigned to the outside counsel to a meeting date regarding the patent application, a number of days from the meeting date to a draft of the patent application received date, and a number of days from the draft of the patent application received date to a filing date of the patent application.

10. A system for technology asset management, the system comprising:
  means for receiving technology asset management information via a computer interface accessible through a web browser;
  means for processing the technology asset management information received via the means for receiving technology asset management information, wherein the processing means includes means for tracking and managing information related to outside counsel's preparation, prosecution and/or maintenance of at least one patent application; and
  means for storing at least a portion of the technology asset management information received via the means for receiving technology asset management information.

11. The system of claim 10, wherein the computer interface is a web interface.

12. The system of claim 10, wherein the means for storing at least a portion of the technology asset management information includes a technology asset management database.

13. The system of claim 10, wherein the means for processing the technology asset management information received via the means for receiving technology asset management information includes one or more of a plurality of intercoupled technology asset management modules selected from the group consisting of means for invention submission and processing, a means for patent prosecution management, a means for managing innovation awards, a means for managing patent strategy, and a means for intellectual property licensing management.

14. A computer-readable storage medium comprising a set of computer-exectuable instructions stored thereon, which when executed by a computer, cause the computer to:
  receive technology asset information from a web interface accessible through a web browser for technology asset management customers;
  communicate at least a first subset of the technology asset information to one or more of a plurality of intercoupled technology asset management modules selected from the group consisting of an invention submission module, an innovation awards module, a portfolio management module, a patent strategy module, and an intellectual property licensing management module; and
  store at least a second subset of the technology asset information in a technology asset management server,
  wherein the one or more of the plurality of intercoupled technology asset management modules at least includes the portfolio management module, and wherein the portfolio management module at least includes an outside counsel management module for tracking and managing information related to outside counsel's preparation, prosecution and/or maintenance of at least one patent application.

* * * * *